Nov. 8, 1932.  E. O. GILLAM  1,887,199
LUBRICATOR FOR MOTOR VEHICLES AND THE LIKE
Filed Aug. 31, 1928  2 Sheets-Sheet 1
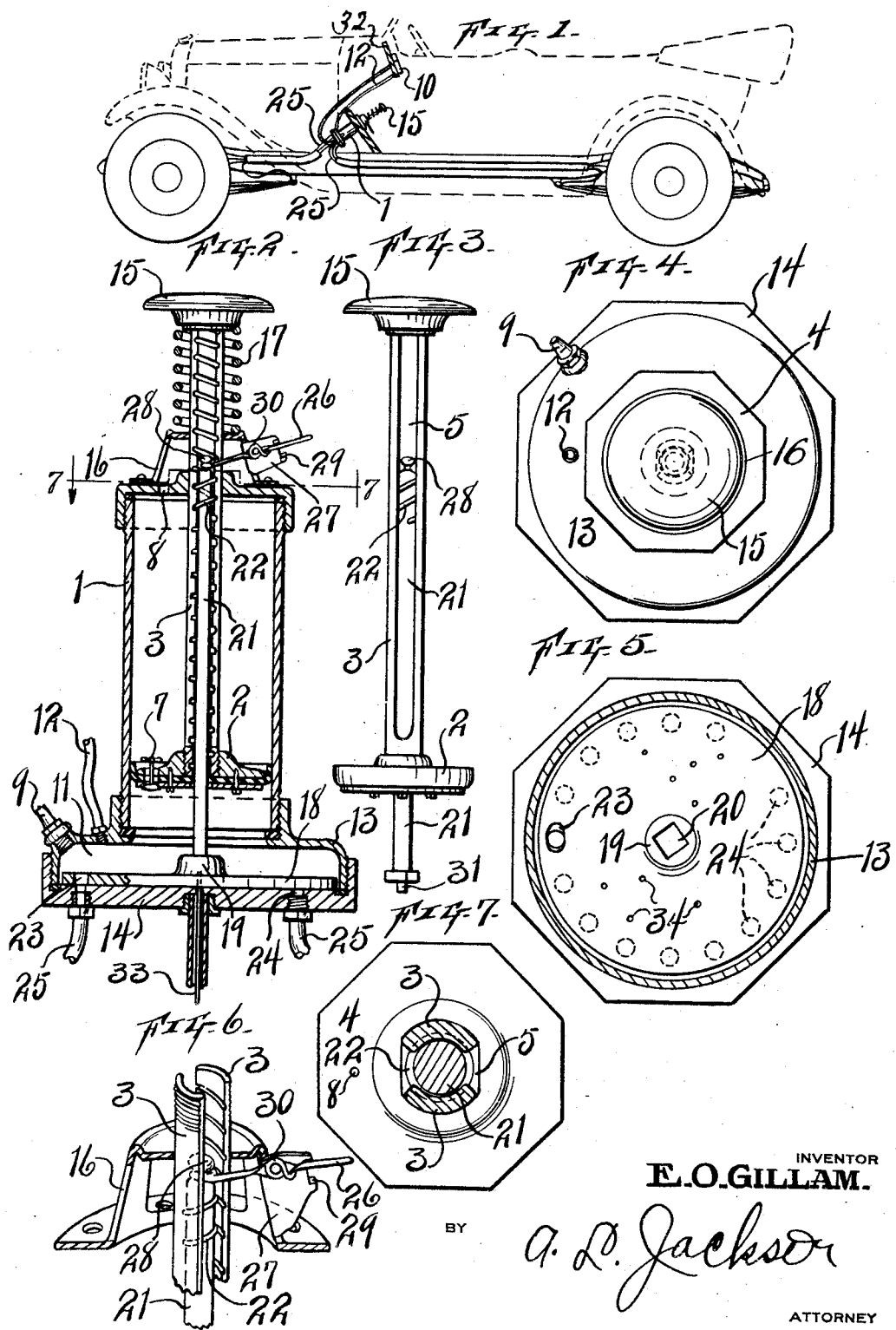
INVENTOR
E. O. GILLAM.
BY
A. L. Jackson
ATTORNEY

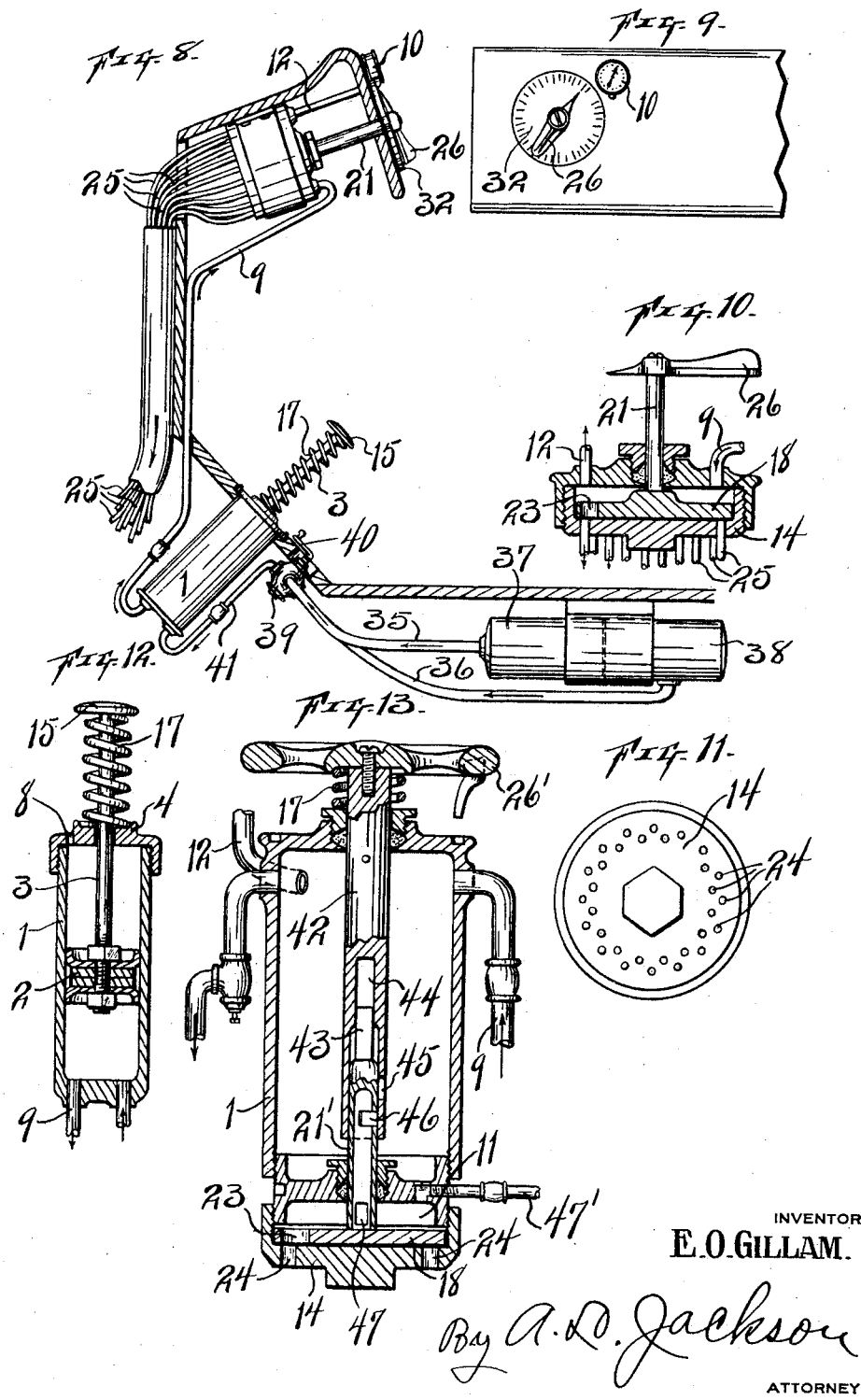

Patented Nov. 8, 1932

1,887,199

UNITED STATES PATENT OFFICE

EARNEST O. GILLAM, OF FORT WORTH, TEXAS

LUBRICATOR FOR MOTOR VEHICLES AND THE LIKE

Application filed August 31, 1928. Serial No. 303,218.

My invention relates to lubricators for motor vehicles and the like and more particularly to force feeding devices for lubricators; and the object is to provide a simple mechanism by which the driver or operator can lubricate any parts or part about the chassis or bearings without leaving his seat and to provide selective devices by which any particular part of the car equipment may be lubricated. Other objects and advantages will be fully explained in the following description and the invention will be more particularly pointed out in the claims.

Reference is had to the accompanying drawings which form a part of this application.

Fig. 1 is a side elevation of a lubricator, showing the location relative to parts of a vehicle to be lubricated.

Fig. 2 is a vertical or longitudinal section of the lubricator reservoir, showing the interior mechanism.

Fig. 3 is an enlarged detail view of the plunger.

Fig. 4 is a plan view of the lubricator.

Fig. 5 is a plan view of the lower part of the lubricator, showing the selective disk.

Fig. 6 is an enlarged perspective view of the plunger operating mechanism.

Fig. 7 is a horizontal section, taken on the line 7—7 of Fig. 2.

Figs. 8 to 13 inclusive show a slight variation.

Fig. 8 is a side elevation of the entire mechanism for lubricating.

Fig. 9 shows the indicator on the dash board.

Figs. 10 and 11 are detail views of the selective feeding means.

Fig. 12 is a detail view of the foot operated pump.

Fig. 13 is a sectional view showing a variation from Fig. 8.

Similar characters of reference are used to indicate the same parts throughout the several views.

This invention includes a barrel 1 and a plunger 2 operating therein. A plunger rod 3 is rigid with the plunger 2 and extends out of the barrel through a top cap 4 which is screwed on the barrel 1. The plunger rod is a hollow rod and a slot 5 is made in the plunger rod. The plunger rod 3 is prevented from turning in the cap 4 by the contour of the opening through the cap. See Fig. 7. The plunger 2 is provided with a check valve 7 and the cap 4 is provided with an air release 8 to prevent formation of a vacuum in the barrel 1. The space below the plunger 2 is occupied by the lubricating material which may be supplied through the pipe 9 which may be simply a connection for a grease gun. The lubricator is provided with a pressure gage 10 located on the dash-board and connected to the reservoir 11 by a pipe 12. The reservoir 11 may consist of the base connection 13 and all the space below the plunger 2 in barrel 1. The connection or base 13 is screwed on the barrel and screwed into a support or base 14. The plunger rod 3 is provided with a bearing or handle 15 for operating the plunger. A spider or support 16 is attached to the cap 4. This spider may serve as a guide for the plunger rod 3 and it supports or forms a seat for the spring 17 which is mounted on the plunger rod 3 and the bearing 15. The plunger 2 is forced downwardly by pressing on the bearing 15. The spring 17 will force the plunger 2 and rod 3 back to normal position.

The lubricator is provided with selective means which includes a disk 18 which is rotatably mounted on the base 14. This disk has a boss 19 formed thereon and an opening 20 to receive a drive shaft 21. The opening 20 may be of any suitable design to receive the lower end of the shaft 21 which should be of a similar shape in cross-section, so that the shaft 21 will turn the disk 18. The shaft 21 is rotated by the plunger rod 3 by reason of the fact that the plunger rod 3 is threaded interiorly and the upper end of the shaft 21 has threads 22. When the plunger 3 is thrust downwardly, the interior threads thereof will drive the shaft 21. The object in rotating the disk 18 is to cause an elongated opening 23 to pass over any one of the openings 24 in the base 14. Pipes 25 communicate with the openings 24 and are extended to the various elements to be lubricated. The lubricant will be delivered to the different pipes 25 whenever the opening 23 passes over an opening 24. Simultaneously with the rotation of the shaft 21 the plunger 2 is forcing the lubricant down through the opening 23. The speed of the rotation of the shaft 21 can be regulated by the pitch of the threads in the plunger rod 3. If any one of the elements to be lubricated requires more lubricant than another, or an unusual amount for a particular reason, the shaft 21 can be lifted out of its socket 20. This may be done by a lever 26 which is fulcrumed in a bracket 27 which is attached to the spider 16. The lever 26 engages the shaft 21 by means of a knob 28 on the shaft 21. The lever 26 may be pressed down and held down by a lug 29 on the bracket 27. A spring 30 will bring the lever 26 back to normal position when the lever is released and at the same time the lever 26 will force the end of the shaft back into its socket 20.

The amount of lubricant to be furnished to different elements may be varied by differences in size of the openings 24 and the space between the openings. The amount of lubricant furnished can be varied by difference in pressure applied to the plunger rod 3. The shaft 21 is provided with a centering lug 31 which aids in making the shaft 21 enter its socket.

An indicator 32 is mounted on the dash board and provided with indicating means corresponding with the openings 24 in disk 18 so that a person can tell which element is being lubricated. A flexible shaft 33 is fixedly connected to the disk 18 and operatively connected to the indicator 32 on the dash board of the vehicle. The names of the elements being lubricated may be shown on the indicator 32. The disk 18 is provided with small openings 34 to permit lubricant to pass through the disk 18 down to the base plate 14 to prevent friction between the disk 18 and the bottom plate 14.

The form of the lubricator shown in Figs. 8 to 12 show the compression chambers and the selective chamber separated. Lubricating material is fed to the compression chamber 1 by means of pipes 35 and 36 from tanks or reservoirs 37 and 38 respectively. The advantage is that two kinds of lubricating material can be used selectively. A three-way cock 39 is provided for this purpose. This cock may be actuated by a handle 40 so that either reservoir 37 or 38 may be used to supply lubricant through the pipe 41. Otherwise, the operation will be as above described, and shown in Figs. 1 to 6 inclusive.

In the form of the device shown in Fig. 13, the same selective means 18 and 14 are used with chamber 1 and supply pipe 9. The disk 18 is rotated by two telescopic members 21' and 42. Lubricant is supplied to chamber 1 through supply pipe 9. The member 21' is hollow up to the shank 43 which is square in cross-section and operates in a cavity 44 in the member 42. The member 42 is provided with an intake port 45 which receives lubricant from the chamber 1. The member 21' has an intake port 46 and a discharge port 47 which delivers lubricant to chamber 11. The member 42 is actuated by a handle 26' and member 42 actuates member 21'. The member 42 is pressed downwardly until the port 45 registers with port 46 to receive a supply of lubricant from chamber 1 to be delivered to chamber 11 and thence through the port 23, as described relative to Figs. 1 to 7. The device as shown in Fig. 13 is provided with a supply pipe 47' through which a supply of lubricant can be taken directly from any other supply source instead of pipe 9 which is ordinarily connected to the engine pump in the crank case.

What I claim is,—

1. A lubricator comprising a casing having a main compression chamber associated therewith, a supplemental compression chamber separated from said main chamber by a stationary partition wall, means for opening and closing communication between said chambers, selective devices cooperating with said supplemental chamber consisting of a cap forming the bottom of said supplemental chamber and provided with a plurality of perforations, a disk rotatable in said supplemental chamber and in contact with said cap closing said perforations and provided with an elongated perforation adapted to register with one of said perforations and each perforation in succession, means for rotating said disk and pipes connected in said perforations for distributing the lubricant.

2. A lubricator comprising a casing having a main compression chamber associated therewith, a supplemental compression chamber separated from said main chamber by a stationary partition wall, means for opening and closing communication between said chambers, means for supplying lubricant to said chambers, selective devices cooperating with said supplemental chamber consisting of a cap forming the bottom of said chamber and forming a bottom for said supplemental chamber and provided with a plurality of distributing pipes connected in said perforations, a disk rotatable in said supplemental chamber closing said perforations and provided with an elongated perforation adapted to register with any one of said perforations and each of said perforations, a shaft for rotating said disk, and resilient means for closing said communication between said chambers.

3. A lubricator comprising a casing having a main compression chamber associated therewith, a supplemental compression chamber separated from said main chamber by a stationary partition wall, means for opening and closing communication between said chambers, means for supplying lubricant to said chambers, means for applying pressure to the lubricant in said chambers, selective devices cooperating with said supplemental chamber consisting of a cap provided with perforations and forming the bottom of said supplemental chamber, distributing pipes connected in said perforations, a disk rotatable on the upper surface of said cap and provided with an opening adapted to register with any one of said perforations and each perforation in succession, and means for rotating said disk.

In testimony whereof, I set my hand, this 5th day of July, 1928.

EARNEST O. GILLAM.